(12) United States Patent
Mihajlović et al.

(10) Patent No.: US 10,928,499 B2
(45) Date of Patent: Feb. 23, 2021

(54) MILLIMETER-WAVE RADAR SENSOR SYSTEM FOR GESTURE AND MOVEMENT ANALYSIS

(71) Applicant: NOVELIC D.O.O., Belgrade (RS)

(72) Inventors: Veljko Mihajlović, Belgrade (RS); Veselin Branković, Belgrade (RS); Dušan Krčum, Belgrade (RS); Ivan Milosavljević, Belgrade (RS); Darko Tasovac, Belgrade (RS); Marko Paraušić, Belgrade (RS); Đorđe Glavonjić, Belgrade (RS)

(73) Assignee: NOVELIC D.O.O., Belgrade (RS)

( * ) Notice: Subject to any disclaimer, the term of this patent is extended or adjusted under 35 U.S.C. 154(b) by 280 days.

(21) Appl. No.: 16/069,884

(22) PCT Filed: Jan. 26, 2016

(86) PCT No.: PCT/RS2016/000001
§ 371 (c)(1),
(2) Date: Jul. 12, 2018

(87) PCT Pub. No.: WO2017/131545
PCT Pub. Date: Aug. 3, 2017

(65) Prior Publication Data
US 2019/0383927 A1  Dec. 19, 2019

(51) Int. Cl.
*G01S 13/44* (2006.01)
*G01S 13/50* (2006.01)
(Continued)

(52) U.S. Cl.
CPC ............ *G01S 13/505* (2013.01); *G01S 7/024* (2013.01); *G01S 7/03* (2013.01); *G01S 7/282* (2013.01);
(Continued)

(58) Field of Classification Search
CPC ........ G01S 13/003; G01S 13/42; G01S 13/44; G01S 13/4454; G01S 13/50;
(Continued)

(56) References Cited

U.S. PATENT DOCUMENTS 6,128,003 A   10/2000   Smith et al.
7,643,006 B2   1/2010   Hill et al.
(Continued)

FOREIGN PATENT DOCUMENTS

CN   103793059   5/2014
WO   2013082806   6/2013

*Primary Examiner* — Timothy A Brainard
(74) *Attorney, Agent, or Firm* — Luoh J. Wu; Continent Patent Office LLP

(57) ABSTRACT

The present invention relates to a gesture detection Apparatus and Method of Operation comprising of an mm-wave radar sensor, having an integrated mm-wave IC front end, with special arrangement of the antenna system, with a new art of angle detection and which does not contain radio down-conversion topology, common in non-professional radar systems. The proposed Apparatus is capable of detecting the two dimensional target angle, having an inherently low-cost system topology, suitable as a replacement in functionality for the commonly used gesture detection system in consumer applications. The proposed apparatus topology consist of two transmitting planar antennae, and two pairs of receiving antennae without the down-conversion of receiver chains, but with introduced analog signal combining structures and mm-wave power detectors. The complete proposed sensor apparatus topology with integrated antennae, mm-wave IC and digital processing parts may be realized in a module smaller than 1×1×0.5 cm and operating in the 60 GHz band for industrial, health care and consumer applications, as well as in the 77-81 GHz band for automotive applications. The integration of the sensor module may be performed in polymer technologies. Sensor can be used as a part of other device or as a gadget.

9 Claims, 10 Drawing Sheets

(51) Int. Cl.
*G01S 7/02* (2006.01)
*G01S 7/03* (2006.01)
*G01S 7/282* (2006.01)
*G01S 7/285* (2006.01)
*G01S 13/89* (2006.01)
*G06F 3/01* (2006.01)

(52) U.S. Cl.
CPC .............. *G01S 7/285* (2013.01); *G01S 13/44* (2013.01); *G01S 13/89* (2013.01); *G06F 3/017* (2013.01)

(58) Field of Classification Search
CPC ........ G01S 13/505; G01S 13/88; G01S 13/89; G01S 2007/027; G01S 7/024; G01S 7/025; G01S 7/03; G01S 7/282; G01S 7/285; G01S 7/352; G01S 7/415; G06F 1/1626; G06F 1/1637; G06F 1/1684; G06F 1/1698; G06F 3/017; G06F 3/043; H01Q 21/24; H01Q 9/285
See application file for complete search history.

(56) References Cited

U.S. PATENT DOCUMENTS

| | | |
|---|---|---|
| 8,064,704 B2 | 11/2011 | Kim et al. |
| 8,223,589 B2 | 7/2012 | Liu |
| 8,345,920 B2 | 1/2013 | Ferren et al. |
| 8,660,300 B2 | 2/2014 | Svajda et al. |
| 8,768,006 B2 | 7/2014 | Subramanian et al. |
| 2012/0001875 A1 | 1/2012 | Li et al. |
| 2012/0200486 A1 | 8/2012 | Meinel et al. |
| 2017/0271764 A1* | 9/2017 | Gabriel .................... H01Q 5/40 |

* cited by examiner a) Apparatus 100. Only power detector <PD2> is needed b) Apparatus 100. Angle detection up to +/-55 degrees

MILLIMETER-WAVE RADAR SENSOR SYSTEM FOR GESTURE AND MOVEMENT ANALYSIS

TECHNICAL FIELD

The present invention relates to a gesture analysis Apparatus and Method of Operation comprising of mm-wave radar sensor with integrated mm-wave IC Front End and having an innovative topology. The proposed Apparatus is capable of detecting the target movements by 2-dimensional angle detection. It has inherently low cost system topology and is suitable as a functional replacement for the state of the art TOA video based sensors. The advantage of the proposed topology is gesture detection in 2D space without the necessary distance detection to target: The proposed Apparatus topology consists of at least one transmitting and two pairs of receiving planar antenna systems, mm-wave radar topology, analog combining circuitry and N mm-wave power detectors, where N takes integer values from 2 and higher. The mm-wave radar topology consists of at least one transmitter chain based on CW radar with 2D angle resolution detection based on power detectors and optional Doppler radar operation principle. A specific method of operation for the proposed Apparatus is introduced. The system is advantageously suitable for low complexity small size HMI interfaces, where the target is a human finger or other parts of human body.

BACKGROUND ART

There is a strong motivation to deploy smart, small in size, low in power consumption and low-cost sensors for gesture sensing applications, in the following application scenarios and specific features:
  a) Detection of dedicated target movement at variable distances, close to the device under control, where target is a part of human body, or some small machine, and where the distance of the target to the object using analyzing gesture information is less than 1 meter.
  b) The system has very low power consumption, where the system including analog and digital circuitry is capable to be integrated in a portable, battery driven device.
  c) The system is very low in size, which may allow its integration in small portable devices, like tablets At the same time, there is a requirement for sensors being able to detect target position at distances larger than one meter by observing a specific area, which are low in cost and power consumption.

The majority of state-of-the-art gesture detection sensors currently deployed on the market are based on time of arrival system approach for short distances and on the video signal processing for longer distances.

Herewith introduced is a principle based on mm-wave radar, with special analog topology, allowing for:
  Very low cost of operation
  Captured gesture information that is independent from the absolute distance to the sensor and which may be recognized and processed in an effective way due to simplified signal processing, allowing for battery powered deployment, significantly lower in power that existing portable gesture systems.
  The key feature of the sensor is a new capability, imposed by the new system topology, to recognize specific target two dimensional movement based on angle detection, which may optionally be combined by the detections of the distances changed, and vibration changes being imposed by the target. The target may be a part of human body, like a finger.

The sensor may also be used at the same time as a vital sign sensor, with the same hardware offering more features than state of art gesture sensors, where the target is the user itself being in front of the mobile device equipped with the sensor.

The sensor may also be used at the same time as an emotion sensor, with the same hardware offering more features than state of art gesture sensors, where the target is the user itself being in front of the mobile device equipped with the sensor.

The sensor may optionally be used as a distance sensor from the integrated mobile device to the target, which may be user itself, with the same hardware offering more features than the state of art gesture sensors. In that case, an extension of the proposed apparatus hardware with increased complexity is required.

State of the art gesture capture systems are outlined in:

U.S. Pat. No. 6,128,003, "Hand gesture recognition system and method" of Hitachi utilizes video based information processing for gesture analysis.

US 20120001875, "Touchless sensing and gesture recognition using continuous wave ultrasound signals" of Qualcomm, addresses ultrasound system as a sensor for gesture information capturing.

U.S. Pat. No. 7,643,006, "Gesture recognition method and touch system incorporating the same" of Smart technologies addresses image analysis for gesture information extraction.

U.S. Pat. No. 8,660,300, "Apparatus and method for optical gesture recognition" of Optical Silicon Laboratories introduces optical transmitters and receivers.

U.S. Pat. No. 8,064,704, "Hand gesture recognition input system and method for a mobile phone" of Samsung is proposing video image comparison for gesture analysis.

US 20120200486, patent application of Texas instruments, "Infrared gesture recognition device and method" proposes infrared image processing for gesture analysis.

U.S. Pat. No. 8,345,920, of Northrop Grumman "Gesture recognition interface system with a light-diffusive screen" introduces a light source and camera system.

U.S. Pat. No. 8,223,589, "Gesture recognition apparatus and method" of MIT proposes ultrasound systems as a main sensor means for gesture analysis.

U.S. Pat. No. 8,768,006, "Hand gesture recognition" of Hewlett-Packard introduces video processing.

CN 103793059, patent application introduces restoration based on the time-domain Doppler gesture recognition method, radar principles, where the movement of the target is causing the changes in phase & frequency, which is proposed.

WO 2013082806, patent application on Nokia, "Method and apparatus for identifying a gesture based upon fusion of multiple sensor signals". In the context of a method, a series of image frames and a sequence of radar signals are received. The method determines an evaluation score for the series of image frames that is indicative of a gesture. Doppler effect based movement analysis is deployed.

The proposed invention utilized the radar principle like in CN 103793059 and WO 2013082806, but can detect the target if this target is not moving, which is not the case in CN 103793059 and WO 2013082806.

This means that the proposed system, in contrast to the state of the art, may detect a higher complexity level of gesture pattern, a whole new class of gestures. For example, a pattern of the 2 dimensional target position, not articulating the movements of the target, which is necessary for Doppler application.

The extended art of gestures, in case where for example the target is a human finger, can be defined by a two dimensional set of angle positions of the target to the sensor, which Is independent if the target has different distances to the sensor itself.

The key building block of the proposed apparatus is a mm-wave radar integrated IC sensor, having a specifically proposed topology and building blocks, differing from state of art solutions. Those building blocks allow for specific simplified signal processing, described in the method of operation, allowing for lower complexity calculations in the digital processing domain, lowering system cost and power consumption.

SUMMARY OF INVENTION

This invention proposes an Apparatus 100 and Method of Operation for inherently low-complexity, low-cost topology and low power mm-wave radar sensor, targeting as a major application gesture detection.

Apparatus 100 and its method of operation provide the following operational features:

1. Detection of the two dimensional angles toward the target; where the target may be a part of the human body, as a generalized target. In many practical cases for consumer and industrial market applications, the target may be a finger moving in front of the sensor being integrated in the table device, like in FIG. 1.

2. Optional ability to determine vital signs of the human in front of sensor, by extended apparatus complexity and signal processing efforts.

3. Ability to be integrated in more complex systems like consumer tablets or smart phones, or industrial command & monitoring devices, being battery powered. This means that in the process of deployment, the proposed apparatus may be small in size, have the ability to be highly integrated, meaning to have a small thickness. Also to have low power consumption, related to the reduced digital signal processing activity compared to the state of art video processing a ToA based gesture sensors.

4. Ability to have the complete apparatus with antennae, analog IC parts and digital parts to be less than 10 mm×10 mm×5 mm in size, being released for mm-wave range operation frequency. The operation to preferably be in ISM band like 60 GHz and 120 GHz ISM Bands for non-automotive applications, like smart phones, tablets and portable consumer goods and in 77-81 GHz band for automotive applications, like automotive HMI interface for multimedia systems.

For the above mentioned features 1-4, all the necessary calculation measures may be performed by Apparatus 100 itself, without the need for the signal processing power of additional external calculation entities.

The choice of mm-wave frequency bands (30 GHz to 300 GHz) and advantageously 60 GHz and 120 GHz ISM bands is mainly related to the size of the antenna system, allowing for a small and compact device, despite the fact that high-gain antenna with more than one radiation element is used, being combined with ISM Band worldwide regulation. Millimeter-wave front preferably operates for deployment in automotive environment, in 77-81 GHz automotive regulatory dedicated mm-wave band.

The proposed system has a technical capability and specific method of operation to combine two different operation modes:

a) Mode one: In this mode the proposed apparatus operates in Continuous Wave (CW) Mode, in a dedicated frequency within the frequency band of Apparatus 100 operation. Two antennae are transmitting and two times two antennae are receiving the reflected signal. Those reflected signals are linearly combined and fed for each pair of receiving antennae, without down conversion, to the N power detectors, where N is an integer number larger than 1. The power detector values and relative values of power detector outputs are processed by low computational efforts in entity 40, in order to calculate the target angle relative to the front plane of Apparatus 100, in azimuth plane with one pair of receiving antennae, and in order to calculate the target angle relative to the front plane of Apparatus 100, in elevation plane with the second pair of receiving antennae. The linear combination of received signals contains amplitude changes and phase shifts realized by a plurality of approaches and realization options, by passive means option, active means options or the combination thereof. The direct output of the system Is a target position being defined as a 2 dimensional angle position, without the distance to target. So if the target, which for example may be a human finger, is changing its two dimensional angle position, the system may detect the gesture, being performed by the finger. Theoretically, if the target is performing a specific gesture at two different distances, but with same two-dimensional angle positions, the system may detect the same gesture. This approach minimizes signal processing if, for example, the real position with 3D resolution is discovered, for the expense of reduced gesture classes abled to be detected. The practical advantage of the system approach is clear: in the intuitive gesture approach by the human, the human is using a part of the body, e.g. a finger, and defines a shape close to the sensor, independently of the distance from the sensor, whether 5 cm or 50 cm, the human may describe the same shape, and the signal processing may handle the two-dimensional angle position of the target more easily and detect a shape with less computational efforts, thus lower system complexity.

b) Optional mode two: In this mode the proposed Apparatus 100 is extended by the additional sub-system of an additional mixer, where one part of the received signal is mixed with the CW signal, filtered and processed in the Doppler frequency mode. In this case, the Doppler principle is used to extend the sensor performance from a pure gesture detection sensor, to a gesture detection sensor with an option of human vital signs capture. This feature is interesting for consumer electronic devices, like smart phone and tablet devices, where the same sensor performs gesture detection and at the same time provides vital sign information and their respective change of the user performing gestures. In this case the sensor may, in a contactless manner, capture the user's control functions toward the tablet device functionality and at the same time capture the user's emotional status or relevant health information to be read out by the tablet device.

The key system relevant components of the proposed Apparatus 100 are:

Planar antenna system, realized by a plurality of technologies and approaches, with one transmitting antenna 221, the second transmitting antenna 222 and two pairs of receiving antennae: first pair 211 and 212, second pair 216 and 217. Optionally, only the transmitting antenna 222 is used.

Millimeter-wave radar with integrated front-end on silicon 10, System on Chip, analog processing of the mm-wave signal, where the following entities are included:

Linear signal combining entities 213 and 218;

N power detectors: 214, 215, 219, 2120 where N may take the even values of 2, 4 or more;

VCO (Voltage Control Oscillator) entity;

Optional PLL (Phase Locked Loop), providing the ability to generate a CW signal in the band of operation, with attached VCO frequency divider to provide the signal for PLL calculation;

PA (Power Amplifier) with PA power control feeding TX antennae 221 and 222;

DC (Direct Current) voltage regulator and circuit biasing;

Test circuitry for integrated IC operation, production and functional safety testing;

Calibration entity with digital and analog means, to influence and adjust the performance on analog parts, in case of semiconductor process and temperature variations as well as to support functional safety requirements;

Digital interface to digital processing entity 40 and control functionality 41, which is realized by the SPI protocol standard;

DC supply connections;

Antenna connections to receiving antennae 211, 212, 216 and 217 as well as for transmitting antennae 221 and 222;

Analog connections from signal conditioning entity and Power detector entities 214, 215, 219 and 2120 to digital processing functionality 30.

DSP (Digital Signal Processing) functionality 40, with at least two analog inputs, having a standardized physical, digital interface 60, with a plurality of realizations; where entity 60 may contain one or more entities 61, 62, 63 or 64.

Mechanical assembly with power supply interface to power supply infrastructure, containing a mechanically integrated antenna, digital and analog functionalities.

Supporting circuitry 50, as part of Apparatus 100, includes functionalities like mechanical connections of Apparatus 100 to a device having a gesture sensor integrated in it, and optional environment protection structure to protect Apparatus 100.

The extended Apparatus 100 has a millimeter-wave radar with integrated front end on silicon 10, with optional additional mixer, where one part of the receiving signal is mixed with the VCO signal, downconverter, filtered, amplified and provided via 30 to a signal processing entity 40. This allows for Doppler signal analysis for the detection of vital signs and for the optional further analysis of the vital signs information.

The proposed apparatus and method of operation allows the production of the complete sensor system in a very low cost range with the introduction of a specific antenna realization option combined with polymer based packaging.

BRIEF DESCRIPTION OF DRAWINGS

FIG. 8a shows power detectors outputs from antennae 211 and 212, distance of one quarter the wavelength.

FIG. 8b shows power detectors outputs from antennae 211 and 212, distance of 0.625 the wavelength.

DESCRIPTION OF EMBODIMENTS

The proposed Apparatus 100 performs the calculation of two-dimensional angles of the target. This allows to detect the position of the target, which may be a part of the human body, particularly a finger, in 2D space, where the actual distance to the target may not play an essential role. Practically this means that in the case of a human finger as a target, the proposed Apparatus 100, with the corresponding method of operation, is able to detect the 2D positions of the target in virtual planes being "quasi-parallel" to the planar antenna surface of the sensor. The Apparatus 100 allows additionally and optionally, to detect and explore vital signs, being able to detect a living being in front of the sensor. This allows for specific additional application features, like switching on and off the gesture detection system only if the user, a human being, is in front of the sensor, or to measure the human's vital signs for the purpose of health care or to analyze the vital signs as a sensor for emotion, mood or fatigue.

Entity 100 enables CW mode for the detection of 2D angles of the target and optional Doppler type operation in CW mode, for vibration detection and analysis.

Figure 6A:
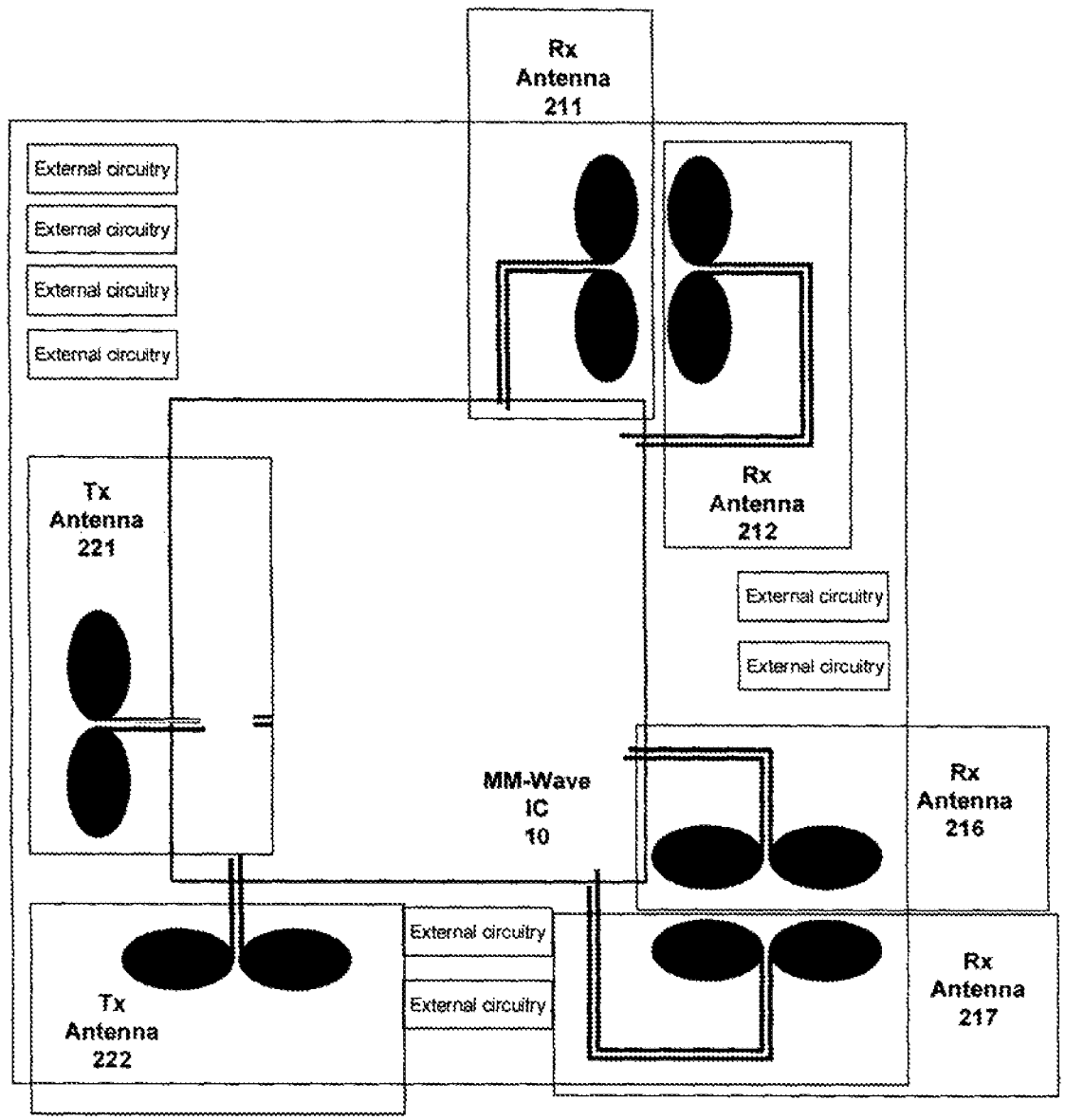
FIG. 6a presents possible Apparatus 100, seen from the top.
Figure 6B:
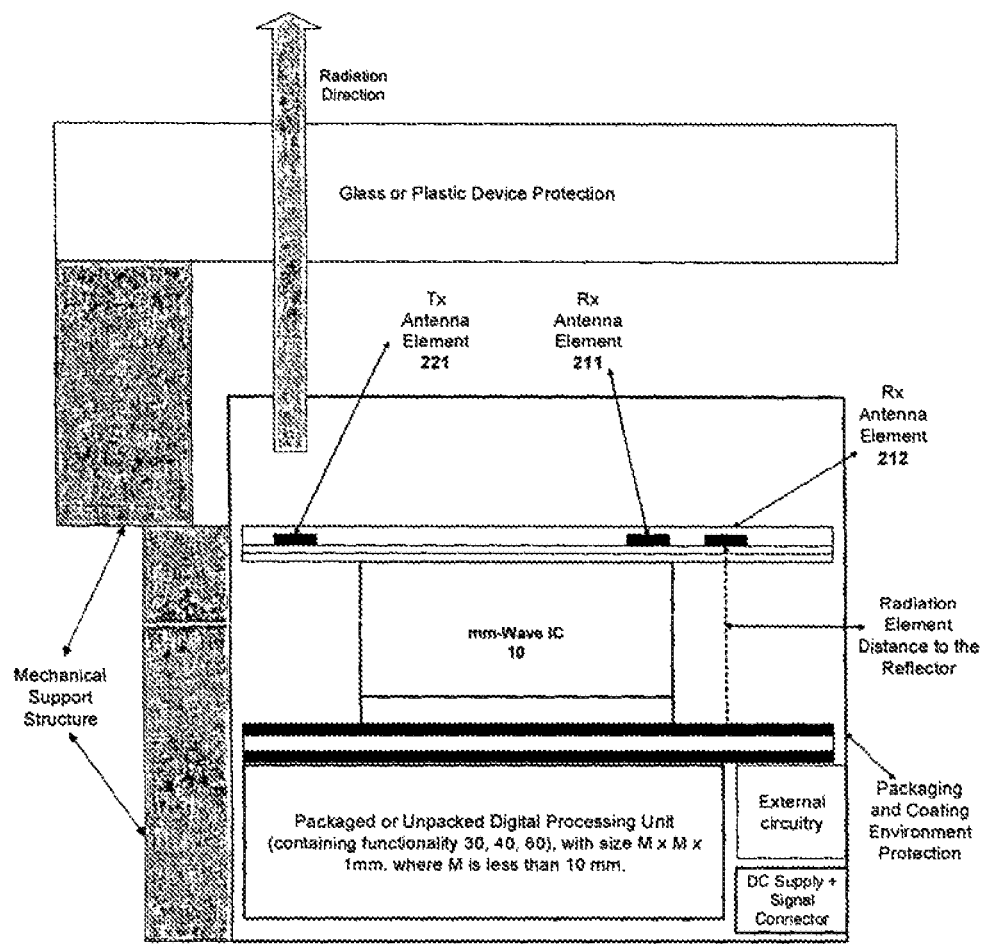
FIG. 6b presents possible Apparatus 100, same as in FIG. 6a, seen from a lateral side showing the direction of radiation toward the target. One Tx antenna has a perpendicular polarization to the other as well as one pair of receiving antennae with the other pair of receiving antennae.

It is proposed to have a planar antenna structure, enabling easy integration in the apparatus. FIG. 6a and FIG. 6b show a possible Apparatus 100 realization option, where two receiving antenna pairs can be observed, one pair: 211 and 212 and the second pair: 216 and 217 and one transmit antenna 221, with an optional transmit antenna 222, all realized with two planar dipoles, having the metalized reflection plate below the antennae, at approximately one quarter the operational bandwidth. One pair of the receiving antenna pairs has a dedicated distance separation in one direction and the second antenna pair has a dedicated distance separation in perpendicular direction. This approach is necessary to detected target 2D angular position.

Advantageously, one receiving antenna pair 211 and 212 and one respective transmit antenna 221 have a different polarization from the second receiving antenna pair 216 and 217 and one optionally used respective transmit antenna 222. This allows for better signal separation, minimization of coupling effects, lower calibration efforts, resulting in a more reliable, lower power consumption and lower cost apparatus.

In general, the PA level and related power control is chosen to cope with:
  Frequency operation mm-wave range, ISM Bands in 60 GHz and 120 GHz and in 77-81 GHz range, for automotive gesture detection applications
  Operational distance of 5 cm to 50 cm.
  Tx and Rx antennae gains in the range of 1 to 6 dB, depending on the number of antenna elements, related to the size of the sensor
  Assembly transmission losses in antenna connection and feeding network of around 1-2 dB
  PA power levels in the range of −3 dBm to 3 dBm and a power range adjustment capability of 25 to 30 dB.

The PA emits a CW or modulated CW signal over transmit antenna 221, with the output power level adjusted by the provided received signal level at the antenna 211 and 212 outputs, that after linear combining and phase shifting of entity 213, can be detected by power detectors' 214 and 215 dynamic range. The PA also emits a CW or modulated CW signal over transmit antenna 222, with the output power level adjusted by the provided received signal level at the antenna 216 and 217 outputs, that after linear combining and phase shifting of entity 218, can be detected by power detectors' 219 and 2120 dynamic range. The power detectors have around 25-30 dB range, by a plurality of realization options. Detectors 214, 215, 219, and 2120 comprise of envelope detection, followed by low pass filter and signal conditioning circuits to provide a related power level, digitalized by the AD converter entity 30. Similar power detectors may be attached to the transmitting part, to ensure the calculation of the transmitted signal level at the respective antenna, for functional safety reasons, or to evaluate the reflected signal levels from each respective transmitting antenna, which may be higher, in case of non-ideal connection to the antenna system 221 or 222.

The state of the art systems for determining the direction of arrival usually down-convert the incoming signal from different antennae and execute a complicated mathematical computation in baseband, in order to calculate the angle.

Figure 4:
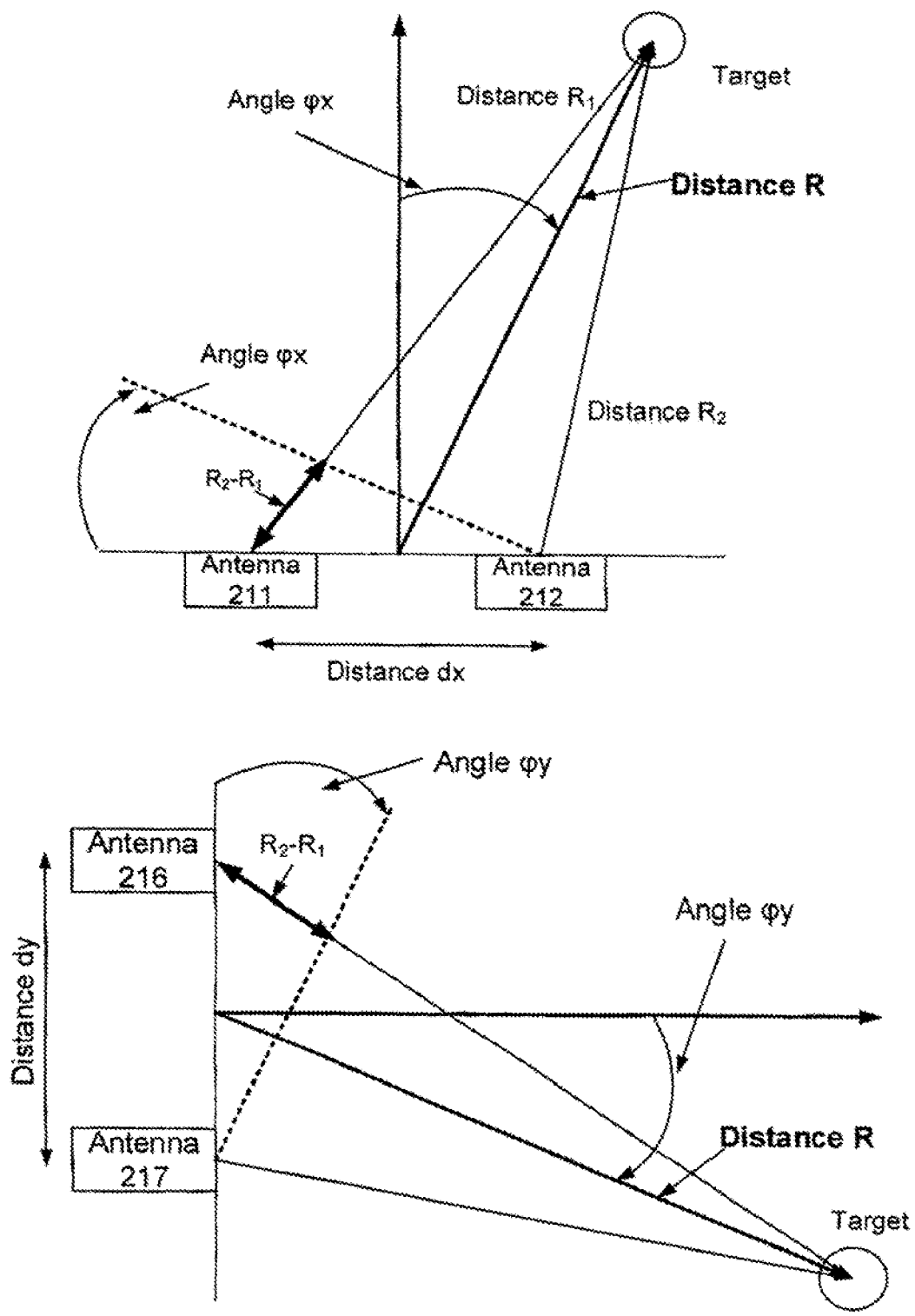
FIG. 4 presents target angle detection topology using 211 and 212 for angle in plane X defined as azimuth as well as 216 and 217 antennae for angle in plane Y, being perpendicular to the plane X addressing elevation.
Figure 5:
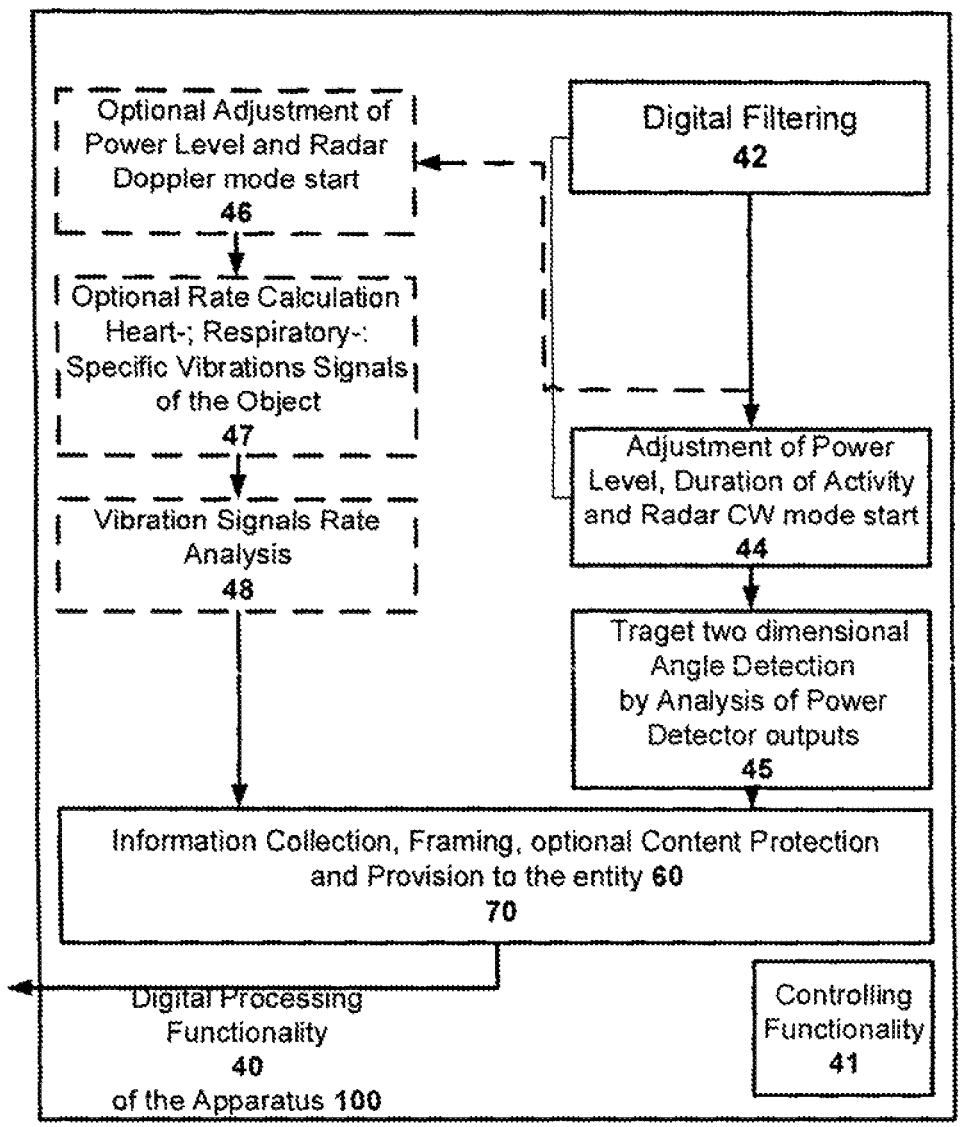
FIG. 5 presents Apparatus 100 digital processing functional blocks.

The basic proposed innovative approach, implies the use of only two receiving antennae pairs, one pair 211 and 212, and the second pair 216 and 217, N power detectors, where N may take the values larger than one, linear combining entities 213 and 218, and no classic down-conversion chains. In FIG. 4 one operation scenario is shown:
  a) With the target in a specific angle related to two receiving antennae, 211 and 212, within a specific reference plane.
  b) With the target in a specific angle related to two receiving antennae, 216 and 217, within a specific reference plane being perpendicular to the detection plane angle of the receiving antennae, 211 and 212.

Due to a small distance between the receiving antennae, compared to the distance to the object, it is assumed that the incoming signal levels are approximately same and two received signals have phase shifts being related to the angle to the obstacle. The angles to the obstacle from each of the antennae may be considered equal to the angle in their geometrical center. The phase difference is related to the distance between the antennae and the frequency of operation. It is assumed that the radiation diagram of both antennae for the same angle is same.

$$phaseDifference = \beta(R_2 - R_1) = 2\pi \frac{f}{c} d\sin(\phi x) \tag{1}$$

the angle $\phi x$ takes values:

$$-\frac{\pi}{2} \leq \phi x < \frac{\pi}{2} \tag{2}$$

meaning that:
$$-1 \leq \sin(\phi x) \leq 1 \tag{3}$$

This means that if the value of $$2\pi \frac{f}{c} d\sin(\phi x)$$

is known, the angle $\phi x$ can be explicitly calculated.

Figure 1:
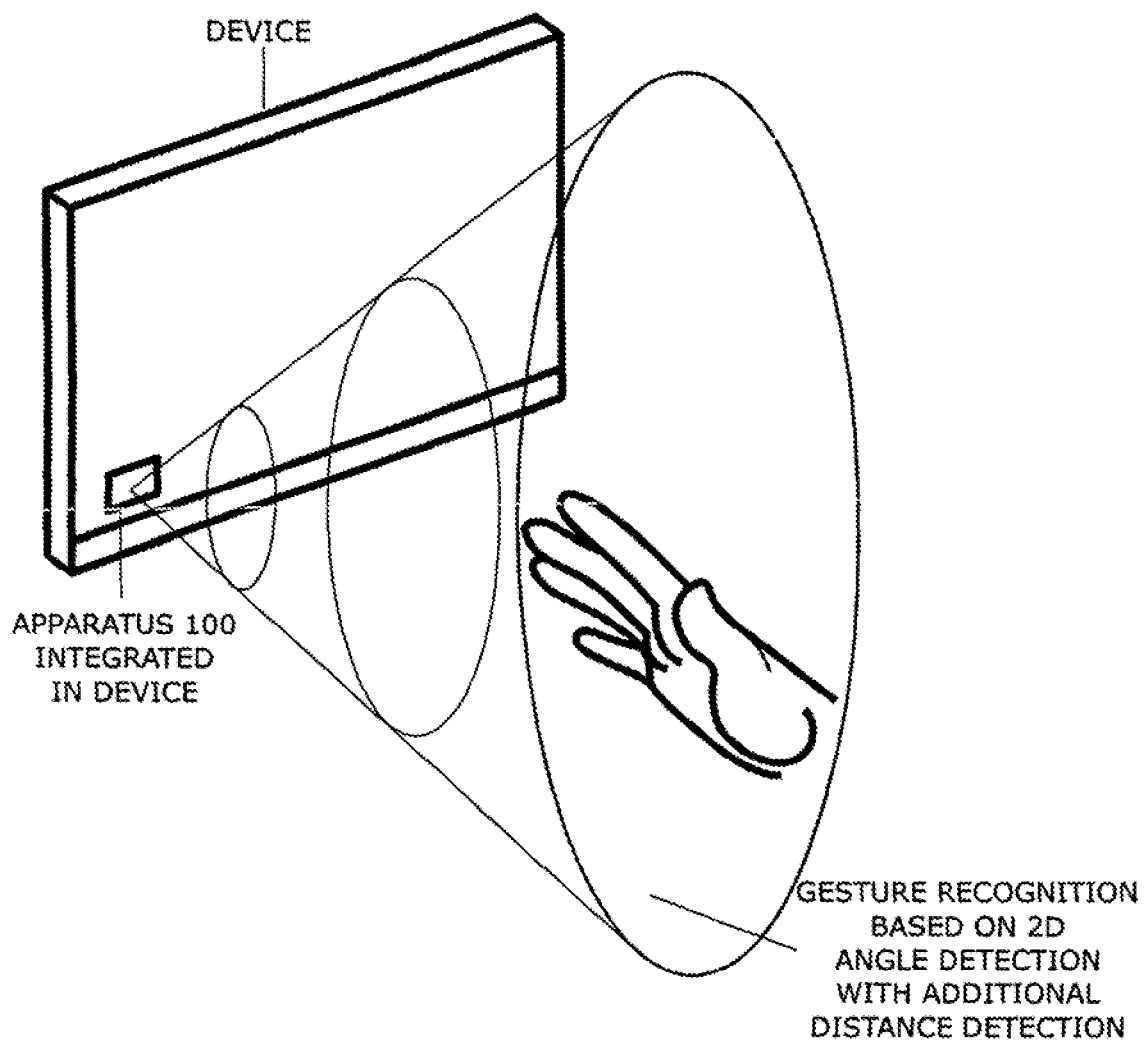
FIG. 1 presents application scenarios for gesture detection using the proposed Apparatuses 100, being integrated in a tablet or other electronic device, used as HMI device.
Figure 2:
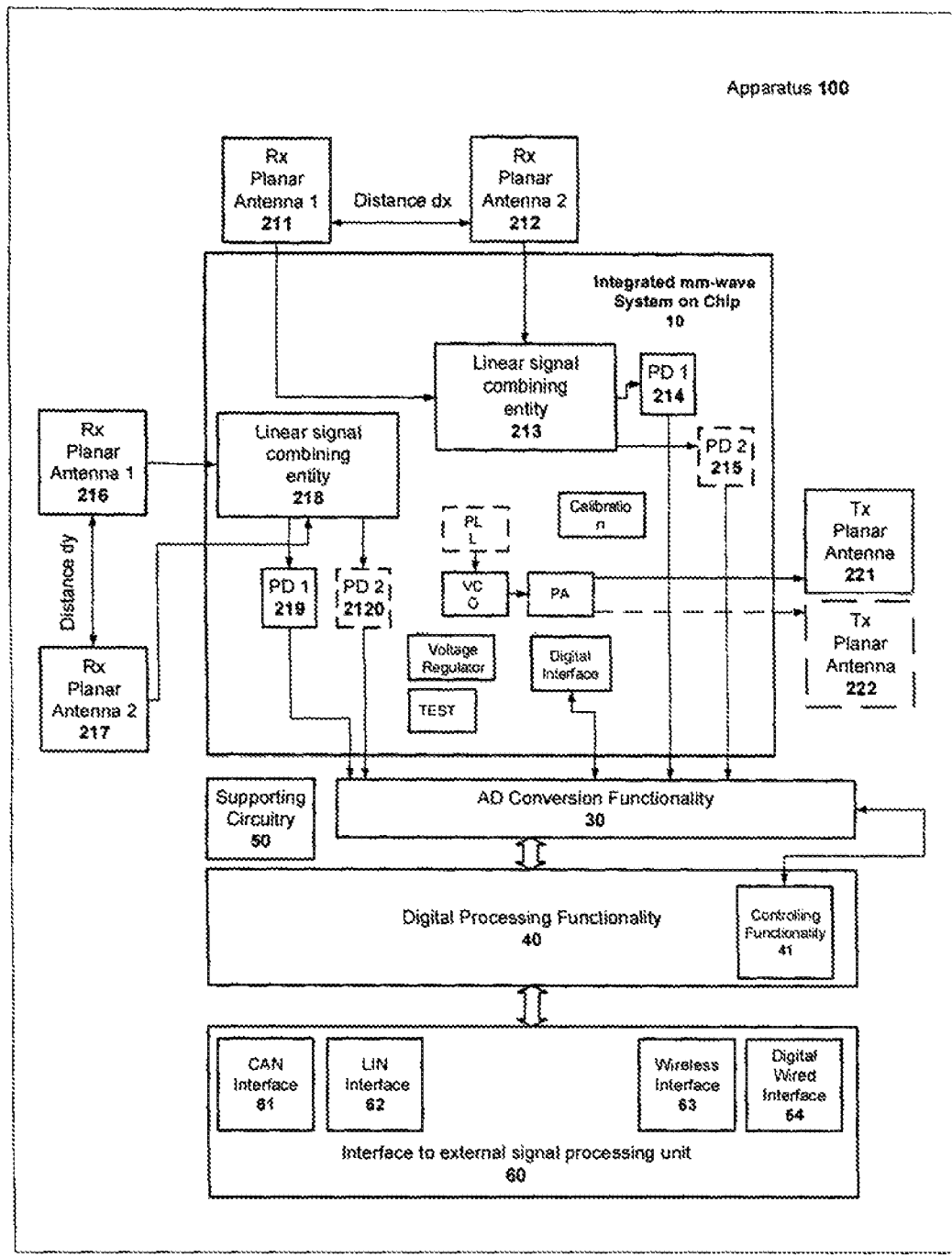
FIG. 2 presents Apparatus 100 functional block diagram.
Figure 3:
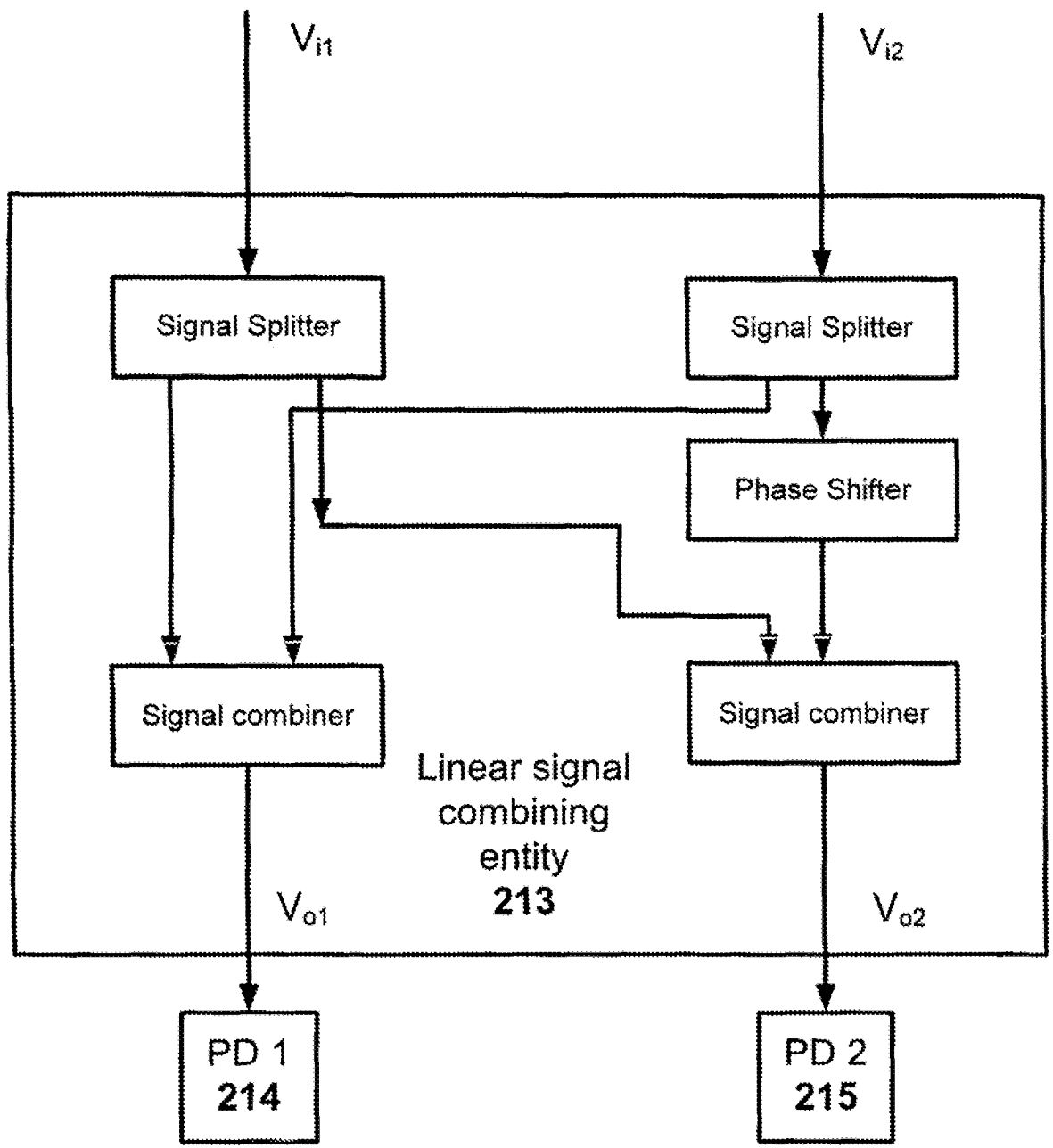
FIG. 3 presents entity 213 or 218 realization options.

Observing entity 213, the linear combination of signals may be realized by a simple topology that includes the addition of signals and addition of the signals where one of the signals additionally has a phase shift of 90 degrees, related to the frequency of operation. Power combiners and phase shifters are realized by a plurality of realization options, using active and passive means on the integrated mm-wave circuit 10. A simple and straight-forward realization option is to have two passive power combiners and one passive phase shifter, as shown in FIG. 3.

Following this approach, two signals are present at the inputs of power detectors 214 and 215, $$V_{o1} = V_{i1} + V_{i2} = 1 + e^{j(\beta d \sin \phi x)} \tag{4}$$

$$V_{o2} = V_{i1} + V_{i2}e^{j\frac{\pi}{2}} = 1 + e^{j(\frac{\pi}{2} + \beta d \sin \phi x)} \tag{5}$$

The power of the signals is then, using power detectors, converted to voltages and these two values are used for the calculation of the angle.

Observing Apparatus 100 topology, the signal of the first receiving antenna 211 is split by the power splitter. One part of the signal is fed to entity 213. It is assumed that the signal is divided in equal measures of power by the power splitter, being realized by a plurality of realization options. On the other side, the signal from antenna 212 comes directly to entity 213. The result is two detected voltages from ideal power detectors.

$$V_{PD1}[V] = \tag{6}$$
$$|V_{comb1}|^2 = \left|\frac{1}{2} + \frac{1}{\sqrt{2}} e^{j\beta d \sin \phi x}\right|^2 = \ldots = \frac{3}{4} + \frac{1}{\sqrt{2}}\cos(\beta d \sin \phi x)$$

$$V_{PD2}[V] = \tag{7}$$
$$|V_{comb2}|^2 = \left|\frac{1}{2} + \frac{1}{\sqrt{2}} e^{j(\frac{\pi}{2}+\beta d \sin \phi x)}\right|^2 = \ldots = \frac{3}{4} - \frac{1}{\sqrt{2}}\sin(\beta d \sin \phi x)$$

Following simple mathematical operations, angle φx is calculated in (8)

$$\phi x = \operatorname{asin}\left(\frac{\lambda}{2\pi d}\operatorname{atan}\frac{0.75 - V_{PD2}}{V_{PD1} - 0.75}\right) \quad (8)$$

The inverse tangent function in (8) yields unambiguous angle in the range of [0, 2π). The inverse sinus is unambiguous because its argument is known to be in the range of [−π/2, π/2). Equation (8) is calculated by arbitrarily numerical means in digital domain, following AD conversion in 30. A practical realization of (8) is driven by the use of simplest calculation efforts, preserving the necessary accuracy of results and taking into account the imperfections of subsystems. Examples are CORDIC algorithm or Taylor series.

Observing receiving antennae 216 and 217, using an analogous approach and mathematical equations (4)-(8), information about the angle toward the target in the plane perpendicular to the reference plane angle can be obtained through power detectors 219 and 2120.

$$\phi y = \operatorname{asin}\left(\frac{\lambda}{2\pi d}\operatorname{atan}\frac{0.75 - V_{PD4}}{V_{PD3} - 0.75}\right) \quad (9)$$

There is no point in increasing signal processing accuracy, when the system itself has imperfections. However, the propagation of errors plays a significant role to the overall accuracy of the detected angle. The angle calculation may be performed by Apparatus 100, while values (6) and (7) may be transferred in digital form to the external computational unit of a device where 100 is integrated (for example mobile phone, tablet etc.), or the gadget 300. The external computational unit will then calculate the angles to the obstacle, as seen by the dedicated different instances of Apparatus 100 and process this information further, to the user Interface.

Looking at the functions (6) and (7) arguments, it can be noticed that the ratio (distance between receiver antennae 211 and 212) over (wavelength), influences the detectable φx.

Figure 8:
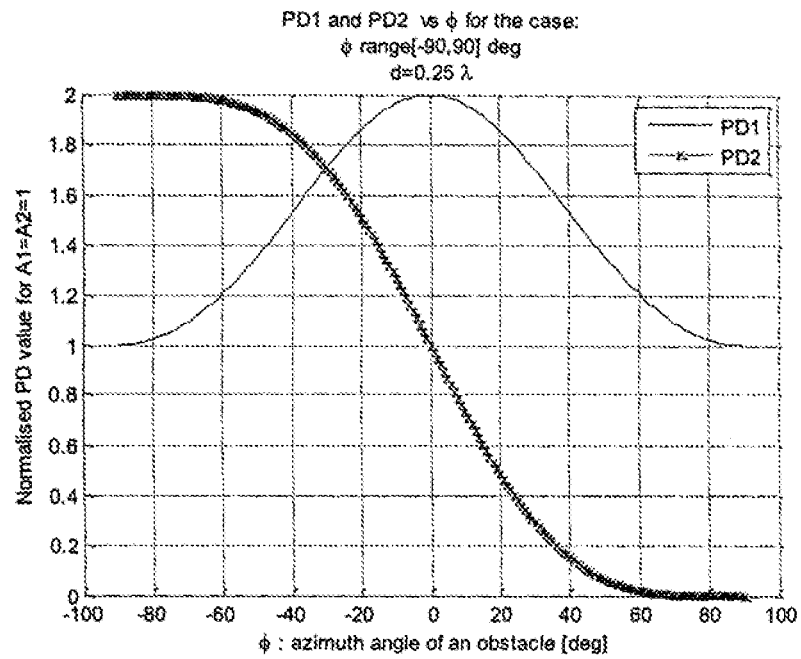
FIG. 8 presents power level detectors 214, denoted as PD1, and 215, denoted as PD2, in apparatus topology 100.
Figure 8:
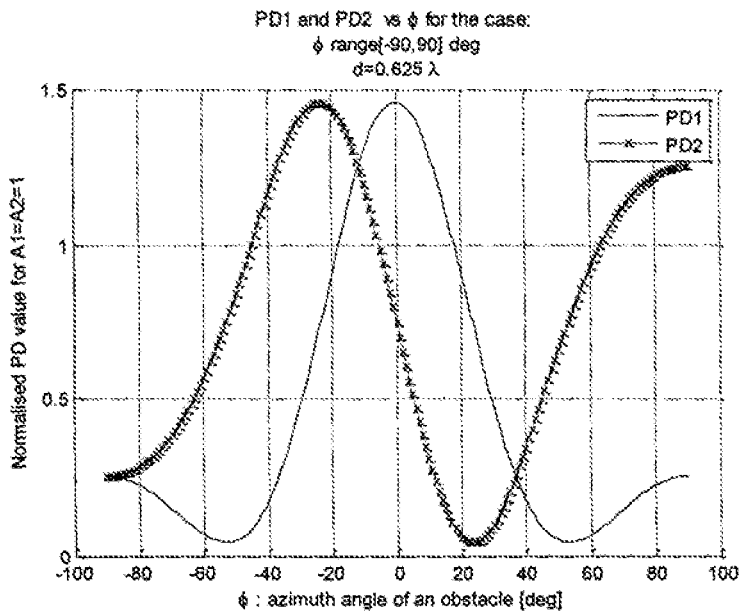

As such, it can be observed from figure FIG. 8a, that if the distance between the antennae is one quarter the wavelength, only one power detector may be used for each perpendicular reference plane, covering the full range of angle φx, −π/2 to π/2. Theoretically, having the minimum distance between antennae 212 and 211, the smallest Apparatus 100 is possible to implement. Practically, the antenna systems have finite dimensions and their centers cannot easily be positioned at distances of one quarter the wavelength.

The proposed planar antenna systems may be realized by a plurality of technologies. If the planar broadband printed strip technologies are addressed, the planar antenna itself has the thickness in the range of less than one quarter the wavelength, so two such antennae being positioned close, would almost touch each other by one quarter the wavelength distance between their centers. On the other hand, the mechanical tolerances of the antennae and the need to have a good yield, requires that those microstrip antennae should be designed to have a larger operational bandwidth, which means an even larger size. By using a dipole based planar antennae with a reflector as shown in FIG. 6b, which are not as thick as microstrip type antennae. That is why it is proposed to use the dipole like planar antennae, being realized by a plurality of topologies.

Moreover, according to the analysis of user scenarios, addressed are the radiation diagrams where the angle φx is usually less than 60 degrees. Having this information, it is concluded that having the distance of 0.625 the wavelength between the antennae, the angles φx in the range of +/−55 degrees may be recovered, which is sufficiently good to realize the printed antenna system. Targeting to cover +/−40 degrees only, the maximum distance between antennae 211 and 212 and between 216 and 217 may increase and allow for better practical realization.

FIG. 8a shows the power detectors outputs at the distance of one quarter the wavelength. It may be observed that the complete angle of +/−90 degrees may be detected by only one power detector; only PD2 is theoretically required to calculate, in a simple way, the angle of the target. However, the distance is too small and hard to be practically realized.

FIG. 8b shows the power detectors outputs with larger distances between receiving antennae of about 0.625 the wavelength, which is easier to be practically realized and it confirms that the angles of about +/−55 degrees may be detected in a simple manner.

Having the information about angles or distances of more than two apparatuses, the accuracy may be increased by averaging the calculated distance, by averaging values from each of the two apparatuses. The enhancement may be realized by omitting those calculations, where angles with smaller calculation accuracy are not used or used with smaller weighting factors in the averaging process. On the other hand, having a device with two gesture sensors, and knowing their physical separation on the device, where they are integrated, and the 2D angles they are measuring, it is possible by a triangulation approach to get also the information about distance to the object.

FIG. 6 shows the top and lateral view of the possible Apparatus 100 practical realization options. Observing the top view, the antenna system 221 and 222 for transmitting the signal and antenna systems pairs: 211, 212 and 216, 217 for receiving the signals may be observed. Transmit and receiving antennae 221, 222, 211, 212, 216, 217 are realized by planar dipole antenna approach with quarter wavelength distance to the reflector, which is released as metalized area of the assembly. Transmitting and receiving antennae 221, 222, 211, 212, 216, 217 have dipole planar parts being specially designed to ensure wide band in combination with good matching to ensure manufacturing tolerance robustness and they are advantageously designed for at least 20% of the operational bandwidth, related to center frequency. It may be observed that receiving antennae 211, 212 have a specific distance dx, important for the detection angle in a particular plane, and receiving antennae 216, 217, have a specific distance dy, important for the detection angle in the plane being perpendicular to the plane being addressed by antennae 211 and 212. Advantageously those distances are same, being between one quarter and one wavelength of the operational bandwidth. Advantageously the detection of the angle in one plane is performed by one dimensional angle detection system comprising one transmitting antenna 211 and two receiving antennae 211 and 212, having a specific linear polarization, whereby the detection of the angle in perpendicular plane is performed by one dimensional angle detection system comprising of one transmitting antenna 212 and two receiving antennae 216 and 217, having a specific linear polarization being orthogonal to the angle detection system of the antennae 221, 211, and 212. This brings less coupling effects. If the receiving antennae have the same polarization, only one transmitting antenna for the apparatus operation would be sufficient, like in FIG. 7.

Figure 7:
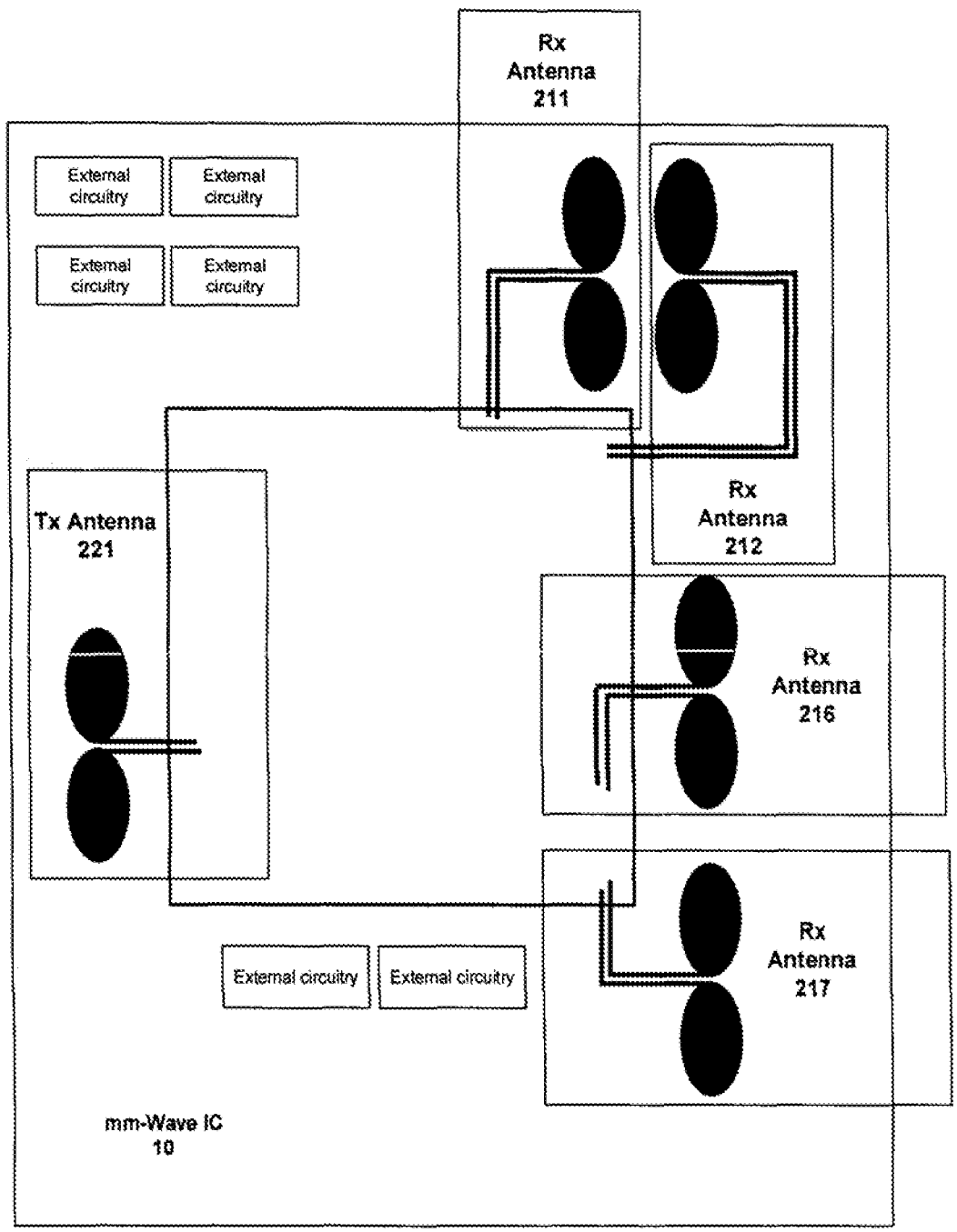
FIG. 7 presents possible Apparatus 100, seen from the top. The system utilizes one TX part 221.

FIG. 7 shows the top view of the possible Apparatus 100 practical realization options. Observing the top view, we notice the antenna system 221 for transmitting the signal and antenna systems pairs: 211, 212 and 216, 217 for receiving the signals. Transmit and receiving antennae 221, 222, 211, 212, 216, 217 are realized by a planar dipole antenna approach with a quarter wavelength distance to the reflector, which Is released as a metalized area of the assembly. Transmitting and receiving antennae 221, 222, 211, 212, 216, 217 have dipole planar parts being specially designed to ensure wide band in combination with good matching, to ensure manufacturing tolerance robustness and they are advantageously designed for at least 20% of the operational bandwidth, related to the center of the operational frequency. It may be observed that receiving antennae 211, 212 have a specific distance dx, Important for the angle detection in the particular plane, and receiving antennae 216, 217 have a specific distance dy, Important for the detection angle in the plane being perpendicular to the plane being addressed by the antennae 211 and 212. Advantageously those distances are same, being between one quarter and one wavelength of the operational bandwidth.

The system in FIG. 6a can operate in two regimes. In the first regime, one Tx is active with two Rx chains with the same polarization and after acquisition and calculation time for the angle in one direction the other Tx and other two Rx chains, with perpendicular polarizations are activated. The second regime implies that the signals are sent and received in both dimensional angle calculations simultaneously. The first option provides less coupling effects and advantageously reduces the digital signal processing complexity, as well as increases system detection sensitivity.

Differential topology of the mm-wave IC 10 has advantages compared to single-end approaches used as state of the art in non-professional mm-wave radars. Dipole-like antennae are inherently prepared for differential feeding. Differential PA outputs minimize parasitic influences in the antenna connections and differential deployment may be used for easier compensation of the mm-wave front irregularities. MM-wave transitions to the mm-wave integrated front ends and antennae are the critical factor influencing direct system cost and production yield.

Single ended PA outputs require good grounding, not easy to achieve with small structures and planar microstrip antennae. This may require special substrates for the realization of transmission lines with special heights, which may increase the system cost. On the other hand, the matching of microstrip like antennae are narrowband, so the manufacturing tolerances may influence the yield of the complete system in negative respect.

In case of dipole antenna topology, the feeding network may be executed in more simple ways, due to the fact that the characteristic impedance of parallel strips is mainly influenced by the distance between the strips and their width, rather that the substrate on which the prints are printed or positioned. This may allow for the use of lower cost assembly techniques in system integration, such are those based on polymer technologies.

Radiation elements of the dipoles are presented in a generic way, showing that the radiation elements are realized as filled thicker shapes, meaning that they are inherently broadband.

The shape of one dipole part may be realized arbitrarily as an ellipsoid, as a rhomboid, as a pentagon and as n-tagons with axial symmetry, or the combination of n-tagons closer to the feeding point and an ellipsoid part in the upper part of the radiation element. The characteristic impedance of the feeding structures is defined by the strip widths, related distance and material where the prints are positioned. The differential feeding lines are compensated in a way that there is no phase difference between the two lines, meaning that they act as if both lines are ideally of same length.

The top view of FIG. 6a and FIG. 7 shows that there Is a place on the side of mm-wave IC structures to connect a dedicated external circuitry possibly related to specific biasing, filtering or protection needs and may impose active or passive components. The lateral view of the proposed Apparatus 100 realization option shows different stacks of the apparatuses. On top of the apparatus there is a printed antennae with its feeding network, omitted in the drawing in order to present a clearer picture of the invention.

The mm-wave IC has a height of less than 1 mm, such that on its back additional material may be added, if required, to ensure about 0.25 the main frequency wavelength (middle of the frequency band of operation), between the center of the printed antenna radiation elements and the metalized surface acting as a reflector. A metalized surface could be printed on plastic materials or as part of the small PCB print.

Behind the metalized layers, denoted with bold lines, a packaged or unpackaged digital processing entity can be observed, being realized as a custom ASIC or a standard microcontroller. It is proposed that this entity contains the AD converters 30, digital processing functionality 40 and Interface functionality 60. It is envisaged that the size of the digital processing unit is in the range of 5×5×1 mm. This corresponds to current state of the art packaged microcontrollers having multiplexed AD converters and being capable of processing two or more inputs required for the Apparatus 100 topology.

Additional external circuitry may be placed close to the Digital Processing Unit. This unit is connected to the mm-wave IC part, placed in the upper part of Apparatus 100. The complete system is environmentally protected, meaning that it may easily be integrated in the dedicated device. The Apparatus 100 can be protected from humidity, dust and at the same time the mm-wave signals can easily pass through coating and protecting materials.

In the lower right corner of the apparatus in FIG. 6b, there is a DC supply and signal connectors to cables connecting the apparatus to an external computational unit. The external computational unit could be part of the device's central computation unit, in order to provide:

Control of the apparatus operation, as well as

Assessment of results coming out the apparatus.

In the left section of FIG. 6b, a mechanical support structure is presented. From one side, this structure is connected to the coated environment protection of the apparatus or is part of the package and is manufactured in the same process and time when the complete apparatus packaging is performed. The mechanical structure is also connected by arbitrary realization means to the device, where sensor integration is performed. Ideally, the mechanical structure is not realized with metals, in order not to influence the antenna radiation diagrams.

The digital part includes arbitrary digital wired interfaces such as, but not limited to: LIN and/or SPI interfaces and/or proprietary digital interfaces, realized by a plurality of technologies, allowing for easy connection to the world outside the Apparatus 100, with a cable connection.

Means of short range wireless connections in 63 are optional.

The wireless short range communication interface 63 may be advantageously released by different wireless communication systems:

a) Short range communication system (up to 2 km) having one or more of these technologies:

Short range 433 MHz, 866 MHz, 915 MHz low data rate, used commonly worldwide in communication systems Wi-Fi or other 2.4 GHz and 5 GHz band communication systems up to 200 meters.

Bluetooth

UWB Systems

WiMAX at 3-4 GHz or in 2-3 GHz range

The information from more than one Apparatus 100 system is gathered in a specific concentrator device and then further communicated over long range communication means, by a plurality of their realizations. Preferable realization options for the complete Apparatus 100 integration is the usage of polymer technologies.

Figure 9:
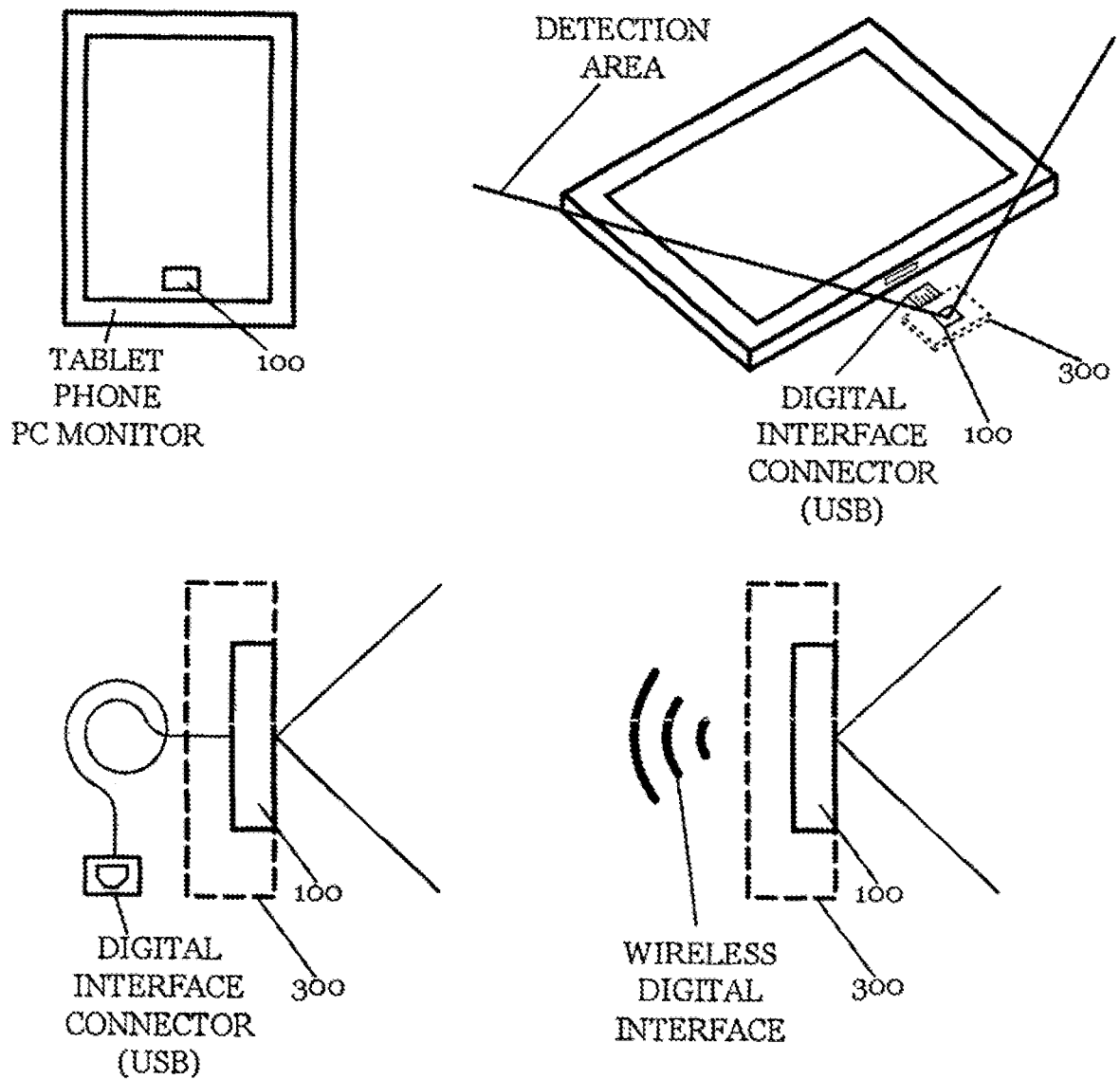
FIG. 9 illustrates application scenarios for Apparatus 100, where Apparatus 100 can be integrated in an electronic device or inside of the separate gadget device with gadget 300. The gadget 300 can be equipped with digital-interfaces connector, such as, but not limited to, USB, or wireless connector, such as, but not limited to WiFi or Bluetooth.

FIG. 9 shows variety of the application scenarios using Apparatus 100. Apparatus 100 can be integrated in the electronic device like display of the mobile phone, tablet or desk top monitor. Apparatus 100 can be integrated with mechanical entity 300, gadget enclosure, and may be connected by digital interface connector to the electronic device, with or without cable. Advantageously the digital interface is USB connector, by the plurality of the realization option and versions. The second option is that Apparatus 100 has wireless connectivity to the electronic device, by the plurality of the wireless communication means and their realizations. This allows the proposed Apparatus 100 to be offered on the market as an independent gadget.

The invention claimed is:

1. Gesture detection sensor apparatus (100) where mm-wave declares operation between 30 GHz and 300 GHz, comprising of:

a first planar antenna system for transmitting mm-wave radio signals (221);

a second planar antenna system for transmitting mm-wave radio signals (222);

a third planar antenna system for receiving mm-wave radio signals (211);

a fourth planar antenna system for receiving first mm-wave radio signals (212), being at a distance (dx) from the third planar antenna system (211), perpendicular to the sensor observing area;

a fifth planar antenna system for receiving second mm-wave radio signals (216), being at a distance (dy) from a sixth planar antenna system (217), perpendicular to the sensor observing area;

an integrated mm-wave radio front end (10), having on-chip integrated mm-wave voltage controlled oscillator, mm-wave power amplifier, digital control interface, power supply, a first mm-wave power detector (214), a second mm-wave power detector (215), a third mm-wave power detector (216), a fourth mm-wave power detector (2120), signal conditioning analog circuitry with voltage gain control at lower frequency and analog filtering structures;

a first analog signal combining entity and a second analog signal combining entity, performing vector linear combination of the two received mm-wave signals, providing two output mm-wave signals, where the liner combining includes adding, splitting and phase shifting treatment of the signal;

an analog to digital conversion hardware entity (30);

a digital processing functionality (40), including a controlling functionality (41) and calculation and memory capacity for performing digital signal processing;

an interface (60) to an entity outside of apparatus (100), including N digital wired interfaces, where N is an integer number larger than zero;

a supporting circuitry (50), including a mechanical interface to the environment;

where the first, third, and fourth planar antenna systems have one linear polarization and the second, fifth, and sixth planar antenna systems have a perpendicular linear polarization;

the third, fourth, fifth, and sixth antenna systems have predefined said distances (dx) and (dy) values, related to the wavelength of the operational frequency;

the system does not include mixer structures for the down-conversion of radio signals;

where said apparatus (100) is observing area in the front of the apparatus (100), with direct line-of-sight operation, where said, apparatus (100), is transmitting mm-wave signals generated in said integrated mm-wave radio front end (10) using said first planar antenna system, where the signal is a Continuous Wave (CW), and said apparatus (100), is receiving mm-wave signals reflected from the observation area of the target by said third planar antenna system; and separately by said fourth planar antenna system, providing two mm-wave respective received signals to said first signal combining entity (213); where said first signal combining entity (213) enables magnitude change, signal phase changes as well as signal combining;

where said apparatus (100), is transmitting mm-wave signals generated in said integrated mm-wave radio front end (10) using said second planar antenna system, where the signal is a Continuous Wave (CW), and said apparatus (100), is receiving mm-wave signals reflected from the observation area of the target by said fifth planar antenna system and separately by said sixth planar antenna system, providing two mm-wave respective received signals to said second signal combining entity (217); where said second signal combining entity (217) enables magnitude change, signal phase changes as well as signal combining;

where said apparatus (100), is providing linearly combined antenna input signals from said third planar antenna system for receiving mm-wave radio signals (211) and said fourth planar antenna system for receiving mm-wave radio signals (212) by said first signal combining entity to said first and second power detectors respectively;

where said apparatus (100), is providing linearly combined antenna input signals from said fifth planar antenna system for receiving mm-wave radio signals (216) and said sixth planar antenna system for receiving mm-wave radio signals (217) by said second signal combining entity to said third and fourth power detectors respectively;

where said apparatus (100), is providinq the outputs of said first, second, third and fourth power detectors to said analog to digital conversion hardware entity (30), which further provides digitized signals to said digital processing functionality (40);

where said digital processing functionality (40) is:

calculating the reference (X) plane angle to the obstacle by utilizing mathematical calculations with the following inputs: said first and second power detectors values, said distance (dx) between said third planar antenna system (211) and fourth planar antenna system (212), using algebraic and inverse trigonometric mathematical calculations in a polynomial manner, where said distance (dx) is chosen to take a specific value related to the wavelength of the operational frequency;

providing the calculated reference (X) plane angle information to said interface (60) to an entity outside of apparatus (100);

calculating the reference (Y) plane angle to the obstacle by utilizing mathematical calculations with the following inputs; said third and fourth power detectors respectively values, said distance (dy) between said fifth planar antenna system (216) and sixth planar antenna system (217), using algebraic and inverse trigonometric mathematical calculations in a polynomial manner, where said distance (dv) is chosen to take a specific value related to the wavelength of the operational frequency;

providing the calculated reference (Y) plane angle information to said interface (60) to an entity outside of apparatus (100);

where said interface (60) to an entity outside of apparatus (100) provides information about object related two-dimensional angle positons of the target in real time to the world outside of the apparatus (100) infrastructure.

2. Apparatus (100) according to claim 1, in which said first and second signal combining entities contain two splitters, two power combiners and one phase shifter of 90 degrees, within said integrated mm-wave radio front end (10), providing two mm-wave combined signals to said first and second mm-wave power detectors inputs and to said third and fourth mm-wave power detectors inputs, respectively.

3. Apparatus (100) according to claim 1, in which the said distance (dx) between said planar third antenna system (211) and said fourth planar antenna system (212) and said distance (dy) between said planar fifth antenna system (216) and said sixth planar antenna system (217) is between one quarter the wavelength and one whole wavelength related to the frequency of operation.

4. Apparatus (100) according to claim 1, in which apparatus integrated mm-wave radio front end (10), has;
one mixer functionality for down-converting radio signals,
one power splitter,
one analog filter,
one variable gain amplifier,
in a manner that after said planar third antenna system (211) said power splitter is realized by providing one portion of the signal to said mixer and one portion of the signal to the first linear combining entity, and where said mixer output is connected to said analog filter, where said analog filter is connected to said the variable gain amplifier, and said variable gain amplifier is connected to the analog to digital conversion hardware entity (30).

5. Apparatus (100) according to previous claim 1, in which apparatus (100) has said integrated mm-wave RF entity (10) being realized by CMOS technology, with gate lengths less than 90 nm.

6. Apparatus (100) according to claim 1, where said analog to digital conversion hardware entity (30), said digital processing functionality (40), said controlling functionality (41), said interface (60) and said integrated mm-wave radio front end (10) are integrated on the same silicon, where the same silicon is defined as one piece of the semiconductor material.

7. Apparatus (100) according to claim 1, where said first planar antenna system for transmitting mm-wave radio signals (221), said second planar antenna system for transmitting mm-wave radio signals (222), said third planar antenna system for receiving mm-wave radio signals (211), said fourth planar antenna system for receiving mm-wave radio signals (212), said fifth planar antenna system for receiving mm-wave radio signals (216), said sixth planar antenna system for receiving mm-wave radio signals (217), and said integrated mm-wave radio front end (10) are integrated on the same silicon, where the same silicon is defined as one piece of the semiconductor material.

8. Apparatus (100) according to claim 1, where said first planar antenna system for transmitting mm-wave radio signals (221), said second planar antenna system for transmitting mm-wave radio signals (222), said third planar antenna system for receiving mm-wave radio signals (211), said planar said fourth planar antenna system for receiving mm-wave radio signals (212) said fifth planar antenna system for receiving mm-wave radio signals (216), and said sixth planar antenna system for receiving mm-wave radio signals (217), are connected to said integrated mm-wave radio front end (10), using a differential feeding and where said first planar antenna system for transmitting mm-wave radio signals (221), said second planar antenna system for transmitting mm-wave radio signals (222), said third planar antenna system for receiving mm-wave radio signals (211), said fourth planar antenna system for receiving mm-wave radio signals (212), said fifth planar antenna system for receiving mm-wave radio signals (216), and said sixth planar antenna system for receiving mm-wave radio signals (217) are dipole antennae.

9. Apparatus (100) according to claim 1, where said first planar antenna system for transmitting mm-wave radio signals (221), said second planar antenna system for transmitting mm-wave radio signals (222), said third planar antenna system for receiving mm-wave radio signals (211), said fourth planar antenna system for receiving mm-wave radio signals (212) said fifth planar antenna system for receiving mm-wave radio signals (216), and said sixth planar antenna system for receiving mm-wave radio signals (217) are realized by planar printed dipoles, where apparatus (100) has a reflector to provide the radiation diagram perpendicular to the surface of the apparatus (100).

* * * * *